United States Patent [19]

Izumi et al.

[11] 3,925,200

[45] Dec. 9, 1975

[54] METHOD FOR SEPARATION OF MIXTURE OF PLASTICS

[75] Inventors: Sumio Izumi, Kokubunji; Hiroshi Tanaka, Chofu, both of Japan

[73] Assignee: Mitsui Mining & Smelting Co., Ltd., Nihonba, Japan

[22] Filed: Feb. 19, 1974

[21] Appl. No.: 443,936

[30] Foreign Application Priority Data
May 18, 1973 Japan............................. 48-54551

[52] U.S. Cl. ..................... 209/9; 209/11; 209/166
[51] Int. Cl.² ............................................. B03B 1/00
[58] Field of Search ................ 209/1, 166, 162–165

[56] References Cited
UNITED STATES PATENTS

| | | | |
|---|---|---|---|
| 787,518 | 4/1905 | Lawrence | 241/20 |
| 2,107,065 | 2/1938 | Peski | 209/166 |
| 2,378,152 | 6/1945 | Nagelvoort | 209/165 |
| 2,389,958 | 11/1945 | Crawford | 210/54 X |
| 2,506,301 | 5/1950 | Klepetko | 209/166 X |
| 2,688,611 | 9/1954 | Jones | 209/166 X |
| 3,074,653 | 1/1963 | Schorsen | 209/3 X |
| 3,284,282 | 11/1966 | Immel | 209/3 X |
| 3,479,281 | 11/1969 | Kikindai | 209/164 X |
| 3,516,841 | 6/1970 | Haveman | 209/173 UX |

*Primary Examiner*—Robert Halper
*Attorney, Agent, or Firm*—Sughrue, Rothwell, Mion, Zinn & Macpeak

[57] ABSTRACT

A method for the separation of a mixture of plastics comprising (1) at least one of polystyrene, polypropylene, polyethylene and polyamide, and (2) polyvinyl chloride into polyvinyl chloride and the above specified plastics other than the polyvinyl chloride by subjecting the mixture of plastics to a flotation method in the presence of an alkali metal or alkaline earth metal salt of lignin sulfonic acid, a hydrophilic organic colloid or a mixture thereof as a conditioning agent, thereby separating and recovering the polyvinyl chloride as a residue from the plastics other than the polyvinyl chloride, is disclosed.

15 Claims, 1 Drawing Figure

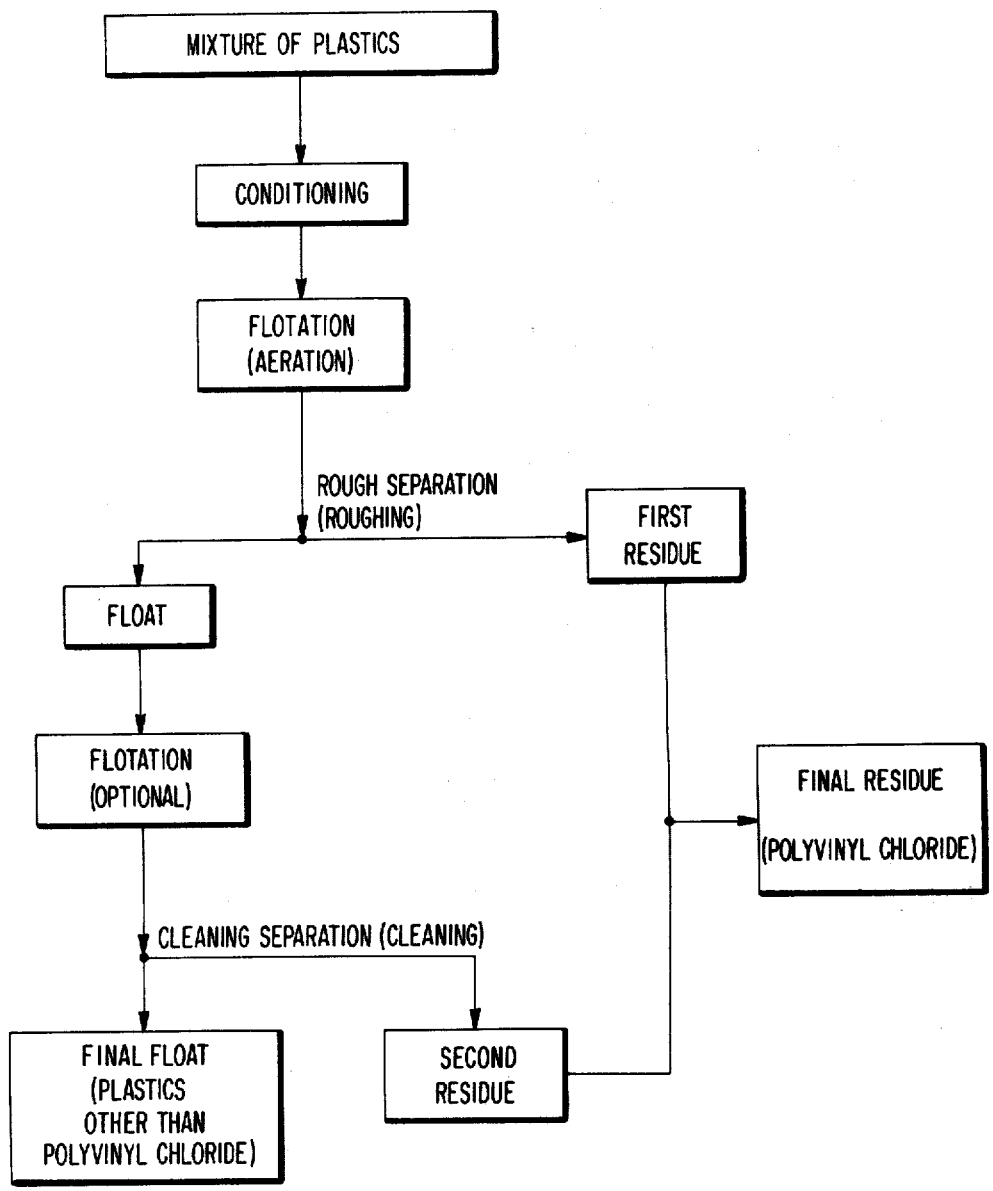

METHOD FOR SEPARATION OF MIXTURE OF PLASTICS

BACKGROUND OF THE INVENTION

1. Field of the Invention

This invention relates to a method for the separation of a mixture of plastics. More particularly, this invention relates to a method for the separation of polyvinyl chloride from a mixture of plastics comprising (1) at least one of polystyrene, polypropylene, polyethylene and polyamide, and (2) polyvinyl chloride, which are quite similar in their specific gravity, by subjecting the above mixture of plastics to flotation in the presence of a conditioning agent.

2. Description of the Prior Art

Hithertofore, waste plastics where two or more different types of plastics are mixed have been disposed of by burying or by burning, or have been reused by melting and molding into molded articles. The most general procedure for the disposal of waste plastics is to subject the waste plastics to incineration, but this treatment is not considered to be a desirable means since, for example, hydrogen chloride gas is usually generated when polyvinyl chloride is burned and the metals contained in the polyvinyl chloride as stabilizers are converted into their oxides which, in turn, adversely affect the incinerator and, in addition, there is a possibility of causing environmental pollution where disposal by burning is used.

Mineral separations are well known in the ore processing art and are often used for separation of ores of similar character. In view of this it might be thought that such a known mineral processing method would be applicable to a mixture of plastics comprizing (1) at least one of polystyrene, polypropylene, polyethylene or polyamide and (2) polyvinyl chloride for separating and recovering the polyvinyl chloride from the mixture of plastics and if so, the problems associated with conventional burning disposal could be solved and the recovered plastic or mixture of plastics could be reused.

It is an object of this invention to provide a method for separating a mixture of plastics comprising polystyrene, polypropylene, polyethylene, polyamide and polyvinyl chloride to recover the polyvinyl chloride from the mixture of plastics.

It is also an object of this invention to provide a method for separating these plastics and to recover the polyvinyl chloride and to eliminate the necessity for use of prior art disposal methods of a mixture of plastics.

SUMMARY OF THE INVENTION

As a result of extensive studies, it was found that the above mixture can effectively be separated according to the method of the present invention utilizing a flotation method.

The present invention comprises subjecting a mixture of plastics comprising (1) at least one of polystyrene, polypropylene, polyethylene and polyamide, and (2) polyvinyl chloride to flotation using an alkali metal or alkaline earth metal salt of lignin sulfonic acid, a hydrophilic organic colloid or a mixture thereof as a conditioning agent to separate the polyvinyl chloride from the mixture of plastics.

BRIEF DESCRIPTION OF THE ACCOMPANYING DRAWING

The FIGURE illustrates a flow chart of a typical embodiment of the method of this invention.

DETAILED DESCRIPTION OF THE INVENTION

As has been set forth above, utilization of a separation similar to those employed in mineral processing might have been thought to be suitable for the objects of this invention. However according to the investigations by the present inventors, each of the above components of the mixture of plastics is quite similar to each other in specific gravity and other physical properties, for example, the electrical charge properties, and it was practically impossible to separate the above mixture of plastics into each of the components by taking advantage of the difference in the specific gravity or by utilizing an electrostatic separation method. As a result of investigations on the separation and recovery of polyvinyl chloride from a mixture of plastics as described above using the flotation method, it was found that a mixture of plastics comprising (1) at least one of polystyrene, polypropylene, polyethylene and polyamide, such as a nylon, and (2) polyvinyl chloride can be separated into the polyvinyl chloride and the other plastics by first comminuting the mixture of plastics into an appropriate size, conditioning the comminuted mixture of plastics in an aqueous liquid medium using an alkali metal or alkaline earth metal salt of lignin sulfonic acid, a hydrophilic organic colloid or a mixture thereof while stirring and subsequently subjecting the mixture to a flotation, whereby plastics other than the polyvinyl chloride can be floated and the polyvinyl chloride can be separated together with a tail medium.

The term "organic colloid" used herein refers to hydrophilic organic colloids which render the surfaces of the polyvinyl chloride more hydrophilic than the plastics other than polyvinyl chloride thereby increasing the wetting characteristics of the polyvinyl chloride. Hydrophilic organic colloids, per se, are well known in the art in the field of ore dressing as described in, for example, A. F. Taggart, *Handbook of Mineral Dressing Ores and Industrial Minerals*, 1948, 12–33 to 12–34, John Wiley and Sons, Inc., New York. Suitable examples of the hydrophilic organic colloid which can be used in the present invention are tannic acid, a quebracho extract, gelatin, glue, saponin and the like. These hydrophilic organic colloids can be used alone or as a mixture of two or more colloids and with alkali metal or alkaline earth metal salts of lignin sulfonic acid.

The present invention is carried out in an aqueous liquid medium which includes water and a salt water. Suitable examples of salt water include sea water, brine, bittern-containing water as well as aqueous solutions containing halides such as NaCl, $MgCl_2$ and $MgBr_2$, etc. sulfates such as $MaSO_4$, $CaSO_4$, $K_2SO_4$ and $Na_2SO_4$, etc. and bicarbonates such as $Ca(HCO_3)_2$ and $NaHCO_3$, etc. Water generally is employed as the aqueous liquid medium.

Suitable examples of the alkali metal or alkaline earth metal salts of lignin sulfonic acid which can be used in the present invention are sodium lignin sulfonate, potassium lignin sulfonate, calcium lignin sulfonate, magnesium lignin sulfonate and the like.

In the method of the present invention, it is believed that the presence of the conditioning agent, i.e., the alkali metal or alkaline earth metal salt of lignin sulfonic acid, the hydrophilic organic colloid or the mixture thereof, causes a certain difference in the wetting characteristic between the surfaces of the plastics to occur, i.e., the surface of the polyvinyl chloride becomes more hydrophilic than that of the other plastics as specified above, whereby the mixture of plastics comprising (1) and (2) above can be separated into the polyvinyl chloride and the plastic other than the polyvinyl chloride by taking advantage of the above difference in the wetting characteristic.

In employing an alkali metal or alkaline earth metal salt of lignin sulfonic acid, a hydrophilic organic colloid or a mixture thereof as a conditioning agent in the method of this invention, the following parameters are considered to affect the efficiency of the flotation:

1. Weight ratio of the liquid medium and the mixture of plastics,
2. Amount of the conditioning agent used with respect to the amount of the mixture of plastics,
3. Grain size of the mixture of plastics,
4. Temperature and pH at which the mixture of the liquid medium and the mixture of plastics is conditioned with the conditioning agent.

The first parameter, i.e., the weight ratio of the liquid medium and the mixture of plastics is generally adjusted to a ratio of from about 5 to 15 parts, preferably 5 to 10 parts, by weight of the mixture of plastics per 100 parts by weight of the aqueous liquid medium. When the mixture of plastics is used in a ratio of less than about 5 parts by weight, the volume of the liquid medium to be handled increased thereby making the method uneconomical.

The second parameter, i.e., the amount of the conditioning agent relative to the amount of the mixture of plastics, is preferably in the range of from about 5 to about 100 g, preferably 10 to 50 g, per ton of the mixture of plastics. With an amount below about 5 g, the separation effect of the mixture of plastics attainable in the flotation is poor and with an amount of more than about 100 g, no additional advantages in the separation can be observed over the effect obtainable by using about 100 g of the conditioning agent.

With respect to the grain size of the mixture of plastics, the third parameter, the distribution of the grain size is not critical so long as more than 80% by weight of the mixture of plastics has a grain size on the order of approximately less than 10 mm. However, from the standpoint of handling and economy, it is preferred that more than 80% by weight of the mixture of plastics has a grain size of from 2 to 6 mm, most preferably 3 to 4 mm.

The temperature for the conditioning, the fourth parameter, is not critical in the method of this invention, but is preferably in the range of from about 0° to about 70°C, most preferably at environmental temperature (about 15° to about 35°C). Temperatures below about 0°C are practically not preferred since at such low temperatures the efficiency of separation of the mixture of plastics in the subsequent flotation tends to decrease. On the other hand, the use of a temperature higher than about 70°C makes the method of the present invention uneconomical and, in addition, such a higher temperature is not desirable from the standpoint of the working environment. A preferred pH value for the conditioning is in the range of from about 5 to 10. Such a pH adjustment can be effected using either an alkali such as sodium hydroxide, sodium carbonate, lime of the like or an inorganic acid such as hydrochloric acid, sulfuric acid and the like.

As described above, the conditioning agent can be a mixture of one or more alkali metal or alkaline earth metal salts of lignin sulfonate and one or more hydrophilic organic colloids. The proportion of each of the conditioning agents in the mixture of conditioning agents is not critical.

After completion of the conditioning as described above, the subsequent flotation can be carried out by adding a flotation agent to the aqueous liquid medium containing the mixture of plastics. The flotation agent which can be used in the present invention includes a frothing agent and a collecting agent. These agents can be those commonly used in the flotation in ore dressing techniques as described in A. F. Taggart, Handbook of Mineral Dressing Ores and Industrial Minerals, 1948, 12–06 to 12–18 and 12–42 to 12–47, John Wiley and Sons, Inc., New York. Examples of suitable frothing agents are pine oil, cresylic acid, eucaliptus oil, camphor oil, derivatives of higher alcohols, methyl isobutyl carbinol or a mixture thereof. An example of a frothing agent which has been found to be effective in the method of this invention is pine oil. Suitable examples of collecting agents are a fatty acid or a salt thereof, for example, oleic acid, stearic acid, palmitic acid and the like and an alkali metal salt thereof, most generally, oleic acid or sodium oleate. These flotation agents are generally added in an amount of from 1 to 100 g per ton of the mixture of plastics. Subsequently, an aeration is conducted in a manner well known in conventional flotation procedures and the float is scraped out and the residue is collected together with a tailing liquid. The residence time of the mixture of plastics during the flotation is generally less than 30 minutes, e.g., 5 to 30 minutes. As is apparent to those skilled in the art, the flotation can be effected in a batch manner or a continuous manner, and in either case the amount of the flotation agent, the aeration and the residence time can be the same as described above.

The flotation described above results in a rough separation (so-called "roughing") of polyvinyl chloride and plastics other than polyvinyl chloride. When a higher purity of the separated fractions in this stage is required, each of the fractions may further be subjected to flotation (so-called "cleaning") in the same manner as shown in the flow chart in the FIGURE.

As described previously, the method of this invention comprises conditioning a mixture of plastics comprising polystyrene, polypropylene, polyethylene or polyamide and polyvinyl chloride (either a hard or soft type) in an aqueous liquid medium using an alkali metal or alkaline earth metal salt of lignin sulfonic acid, an organic colloid or a mixture thereof and floating the plastics other than the polyvinyl chloride and simultaneously separating the polyvinyl chloride together with a tail medium. As an optional embodiment an acrylate type plastic, e.g., a methylmethacrylate plastic or an ethylmethacrylate plastic can be present in the mixture of plastics to be separated with such being floated and recovered along with the plastics other than the polyvinyl chloride. Therefore, the method of this invention is advantageous in that it eliminates the problems associated with conventional disposal by burning and it permits the reuse of the separated plastics.

The present invention is further illustrated in greater detail by reference to the following Examples, but they are not to be construed as limiting the scope of this invention. In the examples, all parts, percentages and proportions are by weight unless otherwise indicated.

EXAMPLES

A mixture of polystyrene, polypropylene, polyethylene or nylon with polyvinyl chloride in the proportion as shown in Table 1 was subjected to separation according to the separation procedure shown in the FIGURE under the conditions shown in Table 1. Although the flotation characteristics of polyvinyl chloride are quite similar to those of the polystyrene, polypropylene, polyethylene or nylon, it was found that plastics other than the polyvinyl chloride could effectively be floated in the presence of a lignin sulfonate or tannic acid due to the difference in the hydrophilicity of the surface of the plastics and the flotation of the polyvinyl chloride is selectively inhibited, whereby the above mixture was separated by flotation. The results obtained are shown in Tables 2 to 8 below.

Table 1

| Example No. | Conditions for Flotation Mixture of Plastics (Proportion of Plastics wt%) | Conditioning Agent |
| --- | --- | --- |
| 1 | Polystyrene (50) and Polyvinyl Chloride (50) | Sodium Lignin Sulfonate |
| 2 | Polypropylene (50) and Polyvinyl Chloride (50) | Quebracho Extract |
| 3 | Polyethylene (50) and Polyvinyl Chloride (50) | Calcium Lignin Sulfonate and Quebracho Extract |
| 4 | Nylon (50) and Polyvinyl Chloride (50) | Gelatin |
| 5 | Polystyrene (34), Polypropylene (33) and Polyvinyl Chloride (33) | Tannic Acid |
| 6 | Polyethylene (34), Nylon (33) and Polyvinyl Chloride (33) | Glue |
| 7 | Polystyrene (20), Polypropylene (20), Polyethylene (20), Nylon (20) and Polyvinyl Chloride (20) | Sodium Lignin Sulfonate, Gelatin and Saponin |

EXAMPLE 1

Separation of Polystyrene and Polyvinyl Chloride 10 parts of a mixture of polystyrene and polyvinyl chloride having a grain size of 3 to 6 mm in a proportion of 50:50 by weight were added to 100 parts of water, and sodium lignin sulfonate was added thereto in an amount of 50 g per 1 ton of the mixture of plastics. After allowing the resulting mixture to stand for 10 minutes for conditioning, pine oil was added as a flotation agent to the mixture in an amount of 30 g per 1 ton of the mixture of plastics followed by roughing for 10 minutes and subsequently cleaning for 10 minutes to float the polystyrene and at the same time to separate the polyvinyl chloride together with a tail water. The results obtained are shown in Table 2 below.

Table 2

| Materials | Weight (%) | Results of Flotation Proportion of Plastics (%) | | Recovery (%) | |
| --- | --- | --- | --- | --- | --- |
| | | Polystyrene | Polyvinyl Chloride | Polystyrene | Polyvinyl Chloride |
| Mixture of Plastics as Raw Material | 100.0 | 50.0 | 50.0 | 100.0 | 100.0 |
| Float | 49.0 | 98.4 | 1.6 | 96.4 | 1.6 |
| Residue | 51.0 | 3.5 | 96.5 | 3.6 | 98.4 |

EXAMPLE 2

Separation of Polypropylene and Polyvinyl Chloride

In the same manner as described in the separation of the polystyrene and the polyvinyl chloride in Example 1 above but using 20 g of a quebracho extract per ton of the mixture of plastics, a mixture of polypropylene and polyvinyl chloride was seaprated into each plastic.

The results obtained are shown in Table 3 below.

Table 3

| Materials | Weight (%) | Results of Flotation Proportion of Plastic (%) | | Recovery % | |
| --- | --- | --- | --- | --- | --- |
| | | Polypropylene | Polyvinyl Chloride | Polypropylene | Polyvinyl Chloride |
| Mixture of Plastics as Raw Material | 100.0 | 50.0 | 50.0 | 100.0 | 100.0 |
| Float | 49.5 | 98.8 | 1.2 | 97.8 | 1.2 |
| Residue | 50.5 | 2.2 | 97.8 | 2.2 | 98.2 |

EXAMPLE 3

Separation of Polyethylene and Polyvinyl Chloride

In the same manner as described in the separation of Example 1 above but using 15 g of a mixture of a quebracho extract and calcium lignin sulfonate (1 : 1) per ton of the mixture of plastics, a mixture of polyethylene and polyvinyl chloride was separated into each plastic. The results obtained are shown in Table 4 below.

Table 4

| Material | Weight (%) | Results of Flotation Proportion of Plastics (%) | | Recovery (%) | |
|---|---|---|---|---|---|
| | | Polyethylene | Polyvinyl Chloride | Polyethylene | Polyvinyl Chloride |
| Mixture of Plastics as Raw Material | 100.0 | 50.0 | 50.0 | 100.0 | 100.0 |
| Float | 49.2 | 98.8 | 1.2 | 97.3 | 1.1 |
| Residue | 50.8 | 2.7 | 97.3 | 2.7 | 98.9 |

EXAMPLE 4

Separation of Nylon and Polyvinyl Chloride

In the same manner as described in the separation of Example 1 above but using 10 g of gelatin per ton of the mixture of plastics, a mixture of nylon and polyvinyl chloride was separated into each plastic. The results obtained are shown in Table 5 below.

Table 5

| Material | Weight (%) | Results of Flotation Proportion of Plastics (%) | | Recovery (%) | |
|---|---|---|---|---|---|
| | | Nylon | Polyvinyl Chloride | Nylon | Polyvinyl Chloride |
| Mixture of Plastics as Raw Material | 100.0 | 50.0 | 50.0 | 100.0 | 100.0 |
| Float | 49.1 | 98.5 | 1.5 | 96.7 | 1.5 |
| Residue | 50.9 | 3.2 | 96.8 | 3.3 | 98.5 |

EXAMPLE 5

Separation of Polystyrene, Polypropylene and Polyvinyl Chloride

In the same manner as described in the separation of Example 1 above but using 50 g of tannic acid per ton of the mixture of plastics, a mixture of polystyrene, polypropylene and polyvinyl chloride was separated into plastics other than polyvinyl chloride and polyvinyl chloride. The polyvinyl chloride was recovered with a tail water. The results obtained are shown in Table 6 below.

Table 6

| Material | Weight (%) | Results of Flotation Proportion of Plastics (%) | | Recovery (%) | |
|---|---|---|---|---|---|
| | | Plastics other than Polyvinyl Chloride | Polyvinyl Chloride | Plastics other than Polyvinyl Chloride | Polyvinyl Chloride |
| Mixture of Plastics as Raw Material | 100.0 | 67.0 | 33.0 | 100.0 | 100.0 |
| Float | 67.0 | 98.7 | 1.3 | 98.7 | 2.6 |
| Residue | 33.0 | 2.6 | 97.4 | 1.3 | 97.4 |

EXAMPLE 6

Separation of Polyethylene, Nylon and Polyvinyl Chloride

In the same manner as described in the separation of Example 1 above but using 15 g of glue per ton of the mixture of plastics, a mixture of polyethylene, nylon and polyvinyl chloride was separated into plastics other than polyvinyl chloride and polyvinyl chloride. The polyvinyl chloride was recovered with a tail water. The results obtained are shown in Table 7 below.

Table 7

| Material | Weight (%) | Results of Flotation Proportion of Plastics (%) | | Recovery (%) | |
|---|---|---|---|---|---|
| | | Plastics other than Polyvinyl Chloride | Polyvinyl Chloride | Plastics other than Polyvinyl Chloride | Polyvinyl Chloride |
| Mixture of Plastics as Raw Material | 100.0 | 67.0 | 33.0 | 100.0 | 100.0 |
| Float | 67.0 | 98.5 | 1.5 | 98.5 | 3.0 |
| Residue | 33.0 | 3.0 | 97.0 | 1.5 | 97.0 |

EXAMPLE 7

Separation of Polystyrene, Polypropylene, Polyethylene, Nylon and Polyvinyl Chloride In the same manner as described in the separation of Example 1 above but using 30 g of a mixture of sodium lignin sulfonate, gelatin and saponin (1 : 1 : 1) per ton of the mixture of plastics, a mixture of polystyrene, polypropylene, polyethylene, nylon and polyvinyl chloride was separated into plastics other than polyvinyl chloride and polyvinyl chloride. The polyvinyl chloride was recovered as described above. The results obtained are shown in Table 8 below.

Table 8

| Material | Weight (%) | Results of Flotation Proportion of Plastics (%) | | Recovery (%) | |
|---|---|---|---|---|---|
| | | Plastics other than Polyvinyl Chloride | Polyvinyl Chloride | Plastics other than Polyvinyl Chloride | Polyvinyl Chloride |
| Mixture of Plastics as Raw Material | 100.0 | 80.0 | 20.0 | 100.0 | 100.0 |
| Float | 80.0 | 98.9 | 1.1 | 98.9 | 4.1 |
| Residue | 20.0 | 4.1 | 95.9 | 1.1 | 95.9 |

While the invention has been described in detail and with reference to specific embodiments thereof, it will be apparent to one skilled in the art that various changes and modifications can be made therein without departing from the spirit and scope thereof.

What is claimed is:

1. A method for the separation of a mixture of particulate plastics comprising (1) at least one of polystyrene, polypropylene, polyethylene and polyamide and (2) polyvinyl chloride into at least one of polystyrene, polypropylene, polyethylene and polyamide, and polyvinyl chloride which comprises conditioning said mixture of plastics in an aqueous liquid medium using at least one conditioning agent selected from the group consisting of an alkali metal or alkaline earth metal salt of lignin sulfonic acid, a hydrophilic organic colloid or a mixture thereof, which conditioning agent renders the polyvinyl chloride more hydrophilic than the at least one of polystyrene, polypropylene, polyethylene and polyamide, and subjecting the resulting mixture to a froth-floatation float at least one of polystyrene, polyethylene, polypropylene and polyamide, in the presence of a frothing agent and simultaneously separating said polyvinyl chloride together with said liquid medium.

2. The method according to claim 1, wherein said mixture of plastics is present in a proportion of from about 5 to 15 parts by weight per 100 parts by weight of the aqueous liquid medium.

3. The method according to claim 1, wherein the proportion of said conditioning agent is in the range of from about 5 to 100 g per ton of said mixture of plastics.

4. The method according to claim 1, wherein said conditioning is at a temperature in the range of from about 0° to about 70°C at a pH in the range of from about 5 to about 10.

5. The method according to claim 1, wherein said alkali metal or alkaline earth metal salt of lignin sulfonic acid is sodium lignin sulfonate, potassium lignin sulfonate, calcium lignin sulfonate or magnesium lignin sulfonate.

6. The method according to claim 1, wherein said hydrophilic organic colloid is tannic acid, a quebracho extract, gelatin, glue or saponin.

7. The method according to claim 1, wherein said aqueous liquid medium is water or a salt water.

8. The method according to claim 7, wherein said salt water is sea water, brine or an aqueous solution of a halide, sulfate or bicarbonate.

9. The method according to claim 1, wherein said mixture of plastics is present in a proportion of from 5 to 15 parts by weight per 100 parts by weight of the aqueous liquid medium and wherein the proportion of said conditioning agent is in the range 5 to 100 g per ton of said mixture of plastics.

10. The method according to claim 9, wherein said mixture of plastics is present in a porportion of from 5 to 10 parts by weight per 100 parts by weight of the aqueous liquid medium and wherein the proportion of said conditioning agent is in the range of from about 10 to 50 g per ton of said mixture of plastics.

11. The method according to claim 9, wherein more than 80 percent by weight of the mixture of plastics has a grain size on the order of less than about 10 mm.

12. The method according to claim 10, wherein more than 80 percent by weight of the mixture of plastics has a grain size of from 2 to 6 mm.

13. The method according to claim 12, wherein more than 80 percent by weight of the mixture of plastics has a grain size of from 3 to 4 mm.

14. The method according to claim 1, wherein said frothins agent is pine oil.

15. The method according to claim 1 wherein said frothing agent is added in an amount of from 1 to 100 g per ton of the mixture of plastics.

* * * * *